Patented Oct. 6, 1925.

1,556,067

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

PURIFICATION OF BUTYRIC ALDEHYDE.

No Drawing.     Application filed May 12, 1924.   Serial No. 712,888.

*To all whom it may concern:*

Be it known that I, CHARLES BOGIN, a citizen of the United States, residing at Terre Haute, in the county of Vigo and the State of Indiana, have invented certain new and useful Improvements in the Purification of Butyric Aldehyde, of which the following is a specification.

My invention relates to an improved process for the distillation and purification of butyric aldehydes. The process allows a simple and an easy purification unaccompanied by the formation of high boiling condensation and polymerization products during distillation, and affords a material increase in yield over that obtained by ordinary methods.

It is well known that aliphatic aldehydes are readily condensed or polymerized by the action of heat and impurities. In the case of the butyric aldehydes, i. e., normal butyric aldehyde and isobutyric aldehyde, it is necessary to fractionally distill the crude aldehydes several times to secure products of satisfactory purity and while each successive distillation gives an increasing purity to the aldehyde, the fraction itself is reduced in quantity by each distillation, owing to the formation of high-boiling products.

I have discovered that the presence of a small amount of water in the liquid during the distillation of a butyric aldehyde completely inhibits the formation of condensation or polymerization products and allows a more economical production of pure aldehyde. In the presence of water the aldehyde distills over as a constant-boiling mixture with the water, but this phenomenon is not a detriment to the process as most of the water separates out when the vapors are condensed.

The beneficial result accruing from the addition of water is not due to the formation of a constant-boiling mixture but rather to the presence of water in the liquid in the still. In practise, the water may be conveniently added to the liquid before distillation, or it may be added in small quantities during distillation. As an alternative, steam may be introduced into the aldehyde at room temperature in which case the aldehyde becomes saturated with water through condensation of the vapors and the temperature is gradually raised to the proper temperature for distillation.

In any case, it is necessary that water be present in the liquid throughout the course of distillation, for if there is not sufficient water present to form a constant-boiling mixture with all of the aldehyde to be distilled, the water will be eliminated in the early stages of distillation. In the latter case it is obvious that the aldehyde in the still will be dry during the last stages of distillation, and hence condensation and polymerization losses will occur.

Having generally described my invention I will give a specific example of its use.

Normal butyric aldehyde as prepared by the catalytic dehydrogenation of normal primary butyl alcohol (see U. S. Patent 1,418,448) contains butyl alcohol, butyl butyrate, acetals, and various other condensation and polymerization products. In purifying this material on an industrial scale it is necessary to redistill the material several times and while each distillation gives a purer aldehyde fraction, the total yield is greatly cut down by the formation of condensation and polymerization products.

For example, if relatively pure normal butyric aldehyde boiling at 74–75° C. is rather rapidly distilled, the loss due to the formation of by-products amounts to about ten per cent, and if the distillation is run at a slower rate the loss from this source may be as high as forty per cent. Distillation under a vacuum does not completely eliminate these losses. In any case, the addition of small amounts of water or steam as previously described eliminates the formation of condensation and polymerization products and the material may be redistilled as many times as is desired without loss.

Normal butyric aldehyde forms a constant-boiling mixture with water which distills at about 68° C. and the vapors of this mixture contain about six per cent of the latter substance. On condensation of the vapor, most of the water separates out as a separate layer, since the aldehyde will dissolve only about two per cent of water. In accordance with my invention six per cent of water is added to the aldehyde before distillation or an equivalent amount of water may be added to the liquid in small portions during distillation. If desired, the distillation of butyric aldehyde in the presence of water may be conducted in a partial vacuum, and this type of distillation is particularly useful, when—for various reasons—it is necessary to conduct the distillation at a slow rate.

Normal butyric aldehyde, after distillation according to my process, will contain about two per cent of water, the remainder separating and forming a separate water layer. If it is desired to obtain dry aldehyde, the water can readily be removed from the aldehyde by "salting."

Now, having described my invention, I claim the following as new and novel:—

1. A process for the purification of butyric aldehyde consisting in distilling the aldehyde in the presence of sufficient water to form a constant-boiling mixture with the aldehyde.

2. A process for the purification of butyric aldehyde consisting in vacuum-distilling the aldehyde in the presence of sufficient water to form a constant-boiling mixture with the aldehyde.

3. A process for the purification of normal butyric aldehyde consisting in distilling the aldehyde in the presence of sufficient water to form a constant-boiling mixture with the aldehyde.

4. A process for the purification of normal butyric aldehyde consisting in distilling the aldehyde in the presence of six per cent of water.

5. A process for the purification of normal butyric aldehyde consisting in distilling the aldehyde in the presence of six per cent of water, and removing the moisture from the aldehyde by "salting."

6. A process for the purification of normal butyric aldehyde consisting in vacuum-distilling the aldehyde in the presence of sufficient water to form a constant-boiling mixture with the aldehyde.

7. In a process for the purification of normal butyric aldehyde, the step which consists in maintaining the aldehyde in a moist condition during distillation by adding small quantities of water as required.

CHARLES BOGIN.